Patented May 10, 1949

2,469,914

UNITED STATES PATENT OFFICE 2,469,914

PROCESS FOR PRESERVING PERISHABLES

Walter A. Bridgeman, Racine, Wis., assignor to S. C. Johnson & Son, Inc., Racine, Wis.

No Drawing. Application April 18, 1946, Serial No. 663,247

4 Claims. (Cl. 99—168)

This invention relates to the preservation of perishables. More particularly, it relates to a novel process for preserving perishables, such as fruits and vegetables, from fungi and bacteria.

The application of a wax coating to perishables, such as fruits and vegetables, has become a well-established commercial practice. Various wax-containing compositions have been applied to produce, by a variety of methods, such as dipping, spraying, etc. In order to provide the surface of the perishables with a pronounced gloss or shine, as well as to preserve them, it has long been common practice to employ carnauba wax or mixtures of carnauba wax with paraffin. In emulsion form, this wax gives a glossy coating merely upon drying with little or no rubbing or brushing of the dried coating.

Heretofore, it has been known to add a nontoxic fungicide or mold-retarding agent to a wax-containing coating composition so that this agent may exercise an inhibiting action upon the development of mold or mold spores, and other destructive organisms which may not have been completely removed prior to the application of the wax coating, or which may later come in contact with the perishables.

Difficulties were experienced in developing a suitable process for applying the wax compositions containing the fungicidal agent. One common method, called the dip method, consists of dipping or immersing the produce into a tank containing an aqueous emulsion of wax, together with a fungicidal agent. This emulsion has a low solids content since care must be taken that the composition is not of sufficient strength to smother the treated perishables, for example, oranges and other citrus fruits. If brass roll eliminators or other methods are used to remove the excess composition from perishables treated in a dip tank, they generally remove so much of the wax that the treatment becomes ineffective. Because the fruit or vegetables are often wet when they enter the tank, this results in an ever changing coating composition. When a quantity of perishables is being treated, the concentration of the fungicide becomes increasingly weaker due to the additional water being constantly introduced into the treating composition.

Another method of treating perishables which has been used, especially to treat citrus fruits, is the spray method. By this method the fungicide containing wax emulsion is sprayed onto the produce as it is carried along a conveyor belt. This method, however, is not only a wasteful method as far as the amount of composition is concerned, but is inefficient because the orifices or spray nozzles are continuously becoming clogged by small particles in the treating composition.

In accordance with this invention, I have discovered a process for preserving perishables, such as fruits and vegetables, which comprises adding a fungicidal agent selected from the group consisting of orthophenylphenol, diphenyl, sodium salt of orthophenylphenol and mixtures thereof to an aqueous wax emulsion, agitating the wax emulsion sufficiently to form a foam, and applying the foam to the produce.

Now, having indicated in a general way, the nature and purpose of my invention, the following examples will illustrate the invention. It is to be understood, however, that such examples are presented merely as illustrations of the invention and are not to be construed as limiting the same. In the examples, the ingredients are given in parts by weight, unless otherwise indicated.

Example 1

An aqueous wax emulsion was prepared by melting 136.5 pounds of carnauba wax in a suitable vessel by heating to about 200° F. There was then added 27 pounds of oleic acid, followed by 12.4 pounds of morpholine. The temperature was maintained at about 200° F. and water was slowly added at a rate so as to maintain a transparent gel during the time the gel continued to absorb the water. The addition of the water is continued at this rate until the gel breaks. Then 3.8 pounds of sodium salt of orthophenylphenol was added. The emulsion was then diluted with additional water until the total water content of the emulsion was about 70 gallons. This emulsion was suitable for the treatment of perishables which require only a small amount of fungicidal agent, i. e. 0.5% by weight.

Example 2

An emulsion was prepared following the method of Example 1, except that 22.8 pounds of sodium salt of orthophenylphenol was added. The resulting emulsion was stable and suitable for the treatment of perishables which require a larger concentration of fungicidal agent, i. e. 3% by weight.

Example 3

An emulsion was prepared following the method of Example 1, except that 15.2 pounds of sodium salt of orthophenylphenol was added.

A portion of this emulsion was then placed in a reservoir attached to a table over which oranges passed. The reservoir was mounted above the table and was positioned directly over the path of the oranges. The reservoir was provided with a pipe through which compressed air could enter the emulsion. The emulsion was then agitated by means of the compressed air until a foam was formed. As the foam built up, it began to overflow the reservoir and contacted dry oranges passing along the table. The oranges were then wiped with a plurality of wiper rolls in such manner to leave a uniform thin coating of treating composition on the orange. The orange dried rapidly and had a distinct lustre or gloss surface. When packed in crates and shipped, the oranges showed marked resistance to fungi and bacteria.

Example 4

An aqueous wax emulsion was prepared by melting 136.5 pounds of carnauba wax in a suitable vessel by heating to about 200° F. Three and eight-tenths pounds of orthophenylphenol was added with the wax. There was then added 27 pounds of oleic acid, followed by 12.4 pounds of morpholine. The temperature was maintained at about 200° F. and water was slowly added at a rate so as to maintain a transparent gel while the gel absorbs the water. The addition of the water is continued at this rate until the gel breaks. The emulsion was then diluted with additional water until the total water content of the emulsion was about 70 gallons. The resulting emulsion was a stable emulsion similar to that prepared in Example 1.

Example 5

An emulsion was prepared following the general method of Example 4, except that 15.2 pounds of orthophenylphenol was added. The resulting emulsion was stable. This emulsion when applied to perishables dries with less gloss than the composition of Example 3.

Example 6

An emulsion was prepared following the general method of Example 4, except that diphenyl was used instead of orthophenylphenol. The resulting emulsion was a stable emulsion similar to that prepared in Example 4.

Example 7

The emulsion prepared by Example 4 was shipped to the place of intended use. As it was the desire of the packer to have an emulsion containing about 2% by weight of fungicidal agent due to the character of the perishables to be treated, after a portion of the emulsion was placed in the reservoir of a foamer, similar to that described in Example 3, additional sodium salt of orthophenylphenol was added to the emulsion to bring the concentration of the fungicidal agent up to 2%. The emulsion was then agitated and applied according to the method of Example 3. The treated perishables showed marked resistance to fungi and bacteria.

Example 8

To an emulsion prepared by the method of Example 6, was added sufficient sodium salt of orthophenylphenol to increase the concentration of the fungicidal agent to 3% by weight. Perishables were then treated according to the method of Example 3. The resulting treated perishables were resistant to fungi and bacteria.

Example 9

An emulsion was prepared following the general method of Example 4, except that 7.6 pounds of orthophenylphenol was used. Following the method of Example 7, additional sodium salt of orthophenylphenol was added in situ to bring the concentration of the fungicidal agent up to 2%. When treated, the perishables showed marked resistance to fungi and bacteria.

It is therefore apparent from the above examples that a variety of stable wax emulsions were prepared containing a concentration of fungicidal agent which varies from 0.5 to 3% by weight of the emulsion. While more than 3% of the fungicidal agent may be added without effecting the stability of the emulsion, the use of wax emulsions containing more than 3% of fungicidal agent is not recommended due to the danger of burning the skin of the perishables.

The fungicidal agent operable in this invention is one selected from the group consisting of orthophenylphenol, diphenyl, sodium salt of orthophenylphenol and mixtures thereof.

Diphenyl and orthophenylphenol are oil soluble and should be added to the wax prior to the addition of the emulsifying agent. Sodium salt of orthophenylphenol, on the other hand, is water soluble and may be added as shown in Examples 1 and 3, or may be added in situ. If desired, the entire amount of sodium salt of orthophenylphenol may be added in situ, but this practice is not preferred as a small amount of fungicidal agent, i. e. about 0.5% by weight, will keep the emulsion sweet during storage if subject to contamination. As shown in Examples 7, 8 and 9 sodium salt of orthophenylphenol may be used in situ to increase the concentration of fungicidal agent by simply adding to the prepared emulsion.

While oleic acid and morpholine have been shown as the emulsifying agent, this is not intended to be a limitation on the use of other wax emulsifying agents such as triethanolamine, sodium salts of fatty acids, and the like.

Although carnauba wax has been used in the examples, other waxes, resins and mixtures thereof may be used either in toto or in part.

While the temperature of 200° F. was used in the examples in the preparation of the emulsions, this temperature may be varied over a wide range as taught by the art.

In carrying out this invention, an emulsion containing the desired concentration of fungicidal agent may be placed in a reservoir or tank adjacent to an installation where perishables are to be treated. The perishables are preferably washed and dried and are moved along a line by conveyor belts or rollers or other well-known methods. The emulsion is agitated in the reservoir by known agitating means such as a motor with agitator, or by means of compressed air being introduced into the emulsion. As the foam builds up, it overflows on to the perishables. The perishables are then contacted with a plurality of wiper blades or rolls which wipe the foam uniformly on the surface of the perishables. As a result the perishables are coated with a thin coating of wax emulsion containing the optimum amount of the fungicidal agent which protects the perishables from fungi and bacteria.

There are a number of definite advantages in applying a wax emulsion containing the fungicidal agents heretofore disclosed, in the form of foam such as:

1. By this method the perishables never enter or come in contact with the main quantity of emulsion and therefore, none of the fungicidal agent is utilized or neutralized until it is actually deposited on the surface of the perishable.

2. Because the perishables do not pass through or come in contact with the main body of treating emulsion, any water which might otherwise be carried into the treating solution has no opportunity of diluting the emulsion and the effective concentration of fungicide contained therein.

3. If a substantial quantity of water is being carried on the perishable being treated, it is possible to adjust the concentration of the wax in the treating tank and the fungicidal agent as well, so that an optimum amount will be applied to the perishable irrespective of the presence of the water.

4. In applying the wax emulsion containing the fungicidal agent by the foam method, it is possible to use a higher concentration of wax without the danger of reducing respiration more than desired, since a uniform thin coating is made possible by the wiping action of the wipers.

5. Because the supply tank may be small, it is possible to change the concentration of fungicidal agent to meet changing conditions or products without having to adjust large quantities or lose material because of dilution with water.

Other modes of applying the principle of the invention may be employed instead of those explained, change being made as regards the method herein disclosed, provided the step or steps stated by any of the following claims or the equivalent of such stated step or steps be employed.

I claim:

1. A process for preserving perishables of the character of fruits and vegetables which comprises adding from about 0.5 to 3% by weight of a fungicidal agent selected from the group consisting of orthophenylphenol, diphenyl, sodium salt of orthophenylphenol and mixtures thereof to an aqueous wax emulsion comprising a waxy component, water and an emulsifying component, agitating the wax emulsion sufficient to form a foam and applying the foam to the perishable.

2. A process for preserving perishables of the character of fruits and vegetables which comprises adding from about 0.5 to 3% by weight of orthophenylphenol to an aqueous wax emulsion comprising a waxy component, water and an emulsifying component, agitating the wax emulsion sufficient to form a foam, and applying the foam to the perishable.

3. A process for preserving perishables of the character of fruits and vegetables which comprises adding from about 0.5 to 3% by weight of diphenyl to an aqueous wax emulsion comprising a waxy component, water and an emulsifying component, agitating the wax emulsion sufficient to form a foam, and applying the foam to the perishable.

4. A process for preserving perishables of the character of fruits and vegetables which comprises adding from about 0.5 to 3% by weight of sodium salt of orthophenylphenol to an aqueous wax emulsion comprising a waxy component, water and an emulsifying component, agitating the wax emulsion sufficient to form a foam, and applying the foam to the perishable.

WALTER A. BRIDGEMAN.

REFERENCES CITED

The following references are of record in the file of this patent:

UNITED STATES PATENTS

| Number | Name | Date |
|---|---|---|
| 1,940,530 | Brogden et al. | Dec. 19, 1933 |
| 1,943,468 | Bridgeman et al. | Jan. 16, 1934 |
| 2,129,936 | Johnson | Sept. 13, 1938 |
| 2,173,453 | Mispley et al. | Sept. 19, 1939 |
| 2,186,691 | Belzer | Jan. 9, 1940 |